United States Patent [19]

Komatsubara

[11] Patent Number: 4,791,645
[45] Date of Patent: Dec. 13, 1988

[54] LIGHTING DEVICE

[75] Inventor: Keiichi F. Komatsubara, Tokorozawa, Japan

[73] Assignee: Hitachi, Ltd., Tokyo, Japan

[21] Appl. No.: 849,889

[22] Filed: Apr. 9, 1986

Related U.S. Application Data

[63] Continuation-in-part of Ser. No. 484,849, Apr. 14, 1983, abandoned.

[30] Foreign Application Priority Data

Apr. 19, 1982 [JP] Japan .................................. 57-63824

[51] Int. Cl.$^4$ ............................................... H01S 3/30
[52] U.S. Cl. .......................................... 372/5; 372/1; 372/41; 372/74
[58] Field of Search ..................... 372/1, 5, 73, 74, 41

[56] References Cited

U.S. PATENT DOCUMENTS 3,338,841 8/1967 Brixner ................................. 372/41

Primary Examiner—William L. Sikes
Assistant Examiner—Robert E. Wise
Attorney, Agent, or Firm—Antonelli, Terry & Wands

[57] ABSTRACT

A lighting device is provided for emitting superradiant fluorescent light. First material layers are provided which emit predetermined electromagnetic waves of spontaneous emission when supplied with a predetermined energy (e.g. a pumping ray or beam). Second material layers, transparent to the electromagnetic wave, are stacked between the layers of the first material. To provide an improved light emission, the second material layers are arranged so that the interspaces l between the first material layers are smaller than $c \cdot \tau_R$, where c is the velocity of said electromagnetic wave and $\tau_R$ is a time constant of the spontaneous emission.

13 Claims, 5 Drawing Sheets

LIGHTING DEVICE

This application is a continuation-in-part of Ser. No. 484,849, filed on Apr. 14, 1983, now abandoned.

BACKGROUND OF THE INVENTION

The present invention relates to a solid state lighting device which emits superradiant fluorescent light.

In the present specification, this lighting device shall be tentatively named "Solid Fluoter" (Solid State Super Fluorescent Lighting Device).

Superfluorescent phenomena is the effect starting from an uncorrelated state with population inversion, and superradiance is the radiation process of cooperative spontaneous emission, as described in G. Banfi, Phys. Rev. A12, 2068 (1975). Descriptions of superradiance or superfluorescence are also contained in the following literature:
(1) Laser induced Fusion and X-ray laser studies; edited by F. Jacobs, M. Sally and M. Sargant (Addison-Wesley) 1976.
(2) R. Loudon; The quantum theory of light 142 (Cllarendon Press Oxford) 1974.

In the case of using the gas plasma, however,
(3) R. H. Dicke, Phys. Rev. 93, 439 (1954).
(4) R. Bonifacio et al., Phys. Rev. A4, 302, 854 (1970).
(5) G. Banfi, Phys. Rev. A12, 2068 (1975).

SUMMARY OF THE INVENTION

Dipole moments interact with dipole moments of atom system of other atom systems in the same material layer, and, when the opposite of this occurs, all atoms in a fluorescent material are synchronized as one atom.

An object of the present invention is to propose the solid state lighting device based on a new concept, ranging from an X-ray region to a visible region, by generating coherent superradiant fluorescent light using the construction of the present invention with the fluorescent material layers.

If a coherent X-ray source can be realized using the present invention significant improvements in the progress of various technologies including, e.g., enhancements in the sensitivity of an X-ray CT, can be expected.

Superradiant fluorescent light of the present invention is based on the superradiant fluorescence phenomena and optical resonance by an optical cavity constructed by the fluorescent material layers with dielectric reflection.

The superadiant fluorescence phenomena are interpreted as follows. In an atom system in a fluorescent material layer, all electrons of atoms are excited by the pumping light from a ground state (e.g., K-state) to an excited state (e.g., L-state) of the said atoms. The dipole moments of these excited atoms interact with each other, as a result, and the vectors of the said dipole moments of all atoms are put in order as one atom.

The said dipole moments interact with the dipole moments of other atom systems in the same material layer, and, when the opposite of this occurs, all atoms in a fluorescent material are synchronized as one atom.

In consequence, the spontaneous emission occurs in all atoms at the same time as one atom, therefore very high power coherent light is emitted.

However, the coherency of emitted light based on this alone is not fully adequate. The present invention improves this coherency of the light by using a predetermined multilayer structure of the fluorescent material layers. Its mechanism is explained as follows.

The fluorescent material layers are shown in FIG. 1a with the numeral 2, and can be referred to as fluorescent wall plates. The spontaneous emission light from certain wall plates arrives at and interacts with other wall plates, and the opposite of it occurs. These light emissions interfere with each other and the coherency of these light become excellent.

The inventor proposes a device which is constructed by atom or molecule layer plates (wall plates) emitting the fluorescent photons and dielectrically reflecting these photons and radiating a photon pulse with coherent phase. This operates according to a quantum standing photon wave oscillation in between the layer plates by pumping of high energy exciting photons.

The mechanism of the present invention is as follows. Certain atoms are excited by pumping with high energy photons or a high energy beam, and these atoms emit the photons spontaneously. At this time, these photons excite the nearest atoms, and so on. The electric dipole moments of atoms interfere with each other through the photons, and population inversion (the number of electrons in the excited level of the atoms is more than the number of electrons in ground state of the atoms) is caused in this atom system. Therefore, the photon number increases.

The wall comes to be transparent by the increase of the real part dielectric constant in the wall according to the increasing of the photon number, and emission of the coherent X-ray pulses is caused to come out of the device.

In the case of visible light, the mechanism for the quantum standing wave in between walls is the same as it is for X-rays.

The present invention accomplishes its objects with a proposed structure which emits an electromagnetic wave such as fluorescence X-rays from fluorescent material layers arranged in a basic transparent material and which establishes the condition that a time ($l/c$) in which the emitted light passes through the interspace ($l$) between the fluorescent material layers is not greater than a changing time (transition time: $\tau_R$, in general, transition or probability rate ($1/\tau_R$) is well used) from the transition moment of electrons which are in some orbit of the fluorescent material atom to it which are in other orbits of low energy, namely, $\tau_R > l/c$.

With such a multi-layer solid structure of the atoms, since the atom being the light source does not move, no Doppler effect develops in the fluorescent light emitted in response to external pumping light, and the directions of the k vector are uniform in a unidimensional direction, so that a super fluorescent light beam can be obtained.

BRIEF DESCRIPTION OF THE DRAWING

The present invention will now be described with reference to the accompanying drawings wherein:

FIGS. 9 and 10 show the examples of a lighting devices according to the present invention.

DETAILED DESCRIPTION OF THE PRESENTLY PREFERRED EMBODIMENTS

Figure 1A:
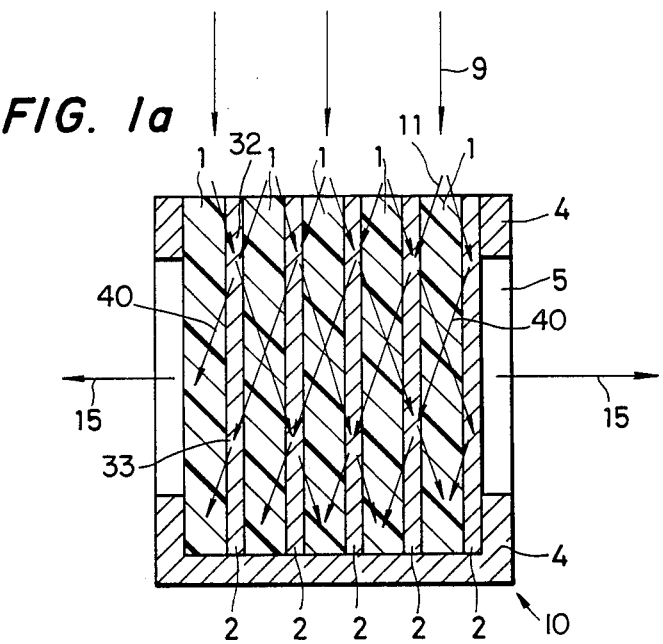
FIGS. 1a, 9 and 10 are sectional views of structures with fluorescent wall plates periodically arranged, for use in the present invention.
Figure 1B:
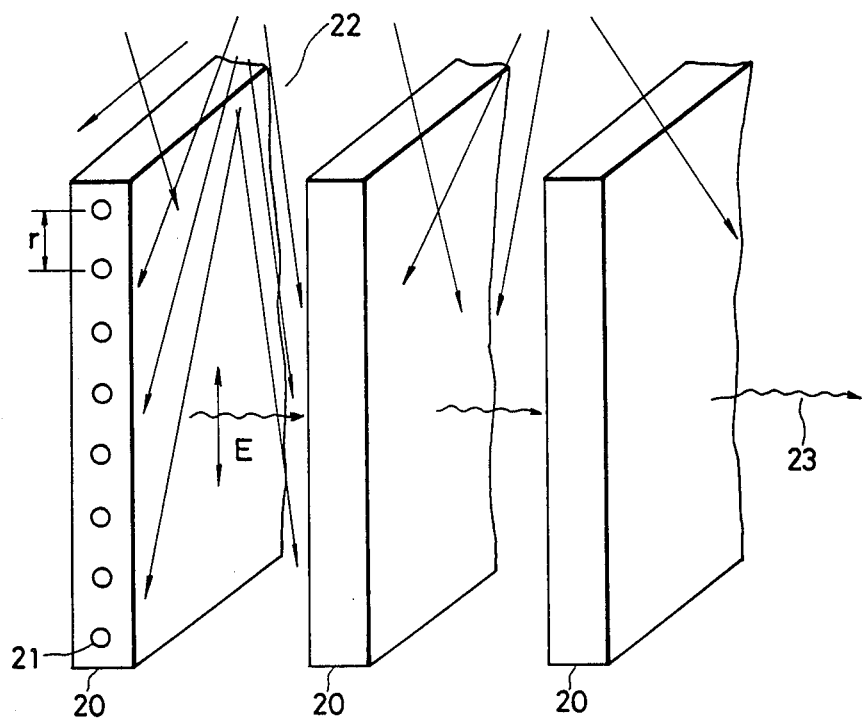
FIG. 1b is a typical perspective view showing the principle of the wall plate structure.

FIG. 1a is a sectional view showing a typical example of a layered fluorescent atom wall structure in the basic solid for emitting a coherent photon wave by pumping (hereinbelow, also termed "layered structure with fluorescent wall plates periodically arranged"), while FIG. 1b is a typical perspective view of the layered structure.

As illustrated in FIGS. 1a and 1b, when a wall plate 20 is externally irradiated with a high energy pumping X-ray (or pumping electron beam) for excitation, fluorescent atoms (or molecules) 21 contained in the wall plate at a density $N_s=(1/r^3)\text{cm}^{-3}$ are excited, and the transition of electrons from the excited level to the ground state brings certain electrons of the whole atom into photon emission. As one result of an energy correlation change based on the emitted photon wave and the dipole shift of the atoms, the natural frequency shift of the fluctuation of a populated electron density within the atom group deviates from $\omega_p$ (the frequency of a lone photon field) and a term proportional to a wave number vector $k^2$ based on a standing wave develops, that is:

$$\omega_k^2 = \omega_p^2 + \frac{3\mu E}{m} k^2$$

where $\mu$ denotes the energy of dipole oscillation. Here, the oscillation frequency $\omega$ of the system is the frequency of the photons for $K < K_c$.

The condition of the correlation between the photon wave and the dipole becomes:

$$\omega = k \cdot v$$

Here, $$\tau_R = \frac{2\pi}{\omega} = \frac{2\pi}{k \cdot v}$$

$$v = \frac{r}{\tau_s}$$

where r denotes the interval of the atoms, and $\tau_s$ the time constant of the natural emission. Due to the pumping light (X-ray), the electron distribution undergoes population inversion. Then, the following holds:

$$\tau_R = \frac{2\pi}{k} \frac{\tau_s}{r} = \frac{2\pi}{k \cdot c} \frac{\tau_s}{\left(\frac{r}{c}\right)}$$

Thus, for the inversion case $$K < K_c, \tau_R = \frac{\tau_s}{(r)} \cdot \tau_p$$

for the lone excitation case, $\tau_R \tau_s$

Accordingly, the oscillations of the group proceed in the range:

$$k^2 < \lambda_D^{-2}$$

$\lambda_D = c\tau_p$ holds, and it is the screening length of the overlapping photon field of the dressed atoms.

When $\tau_p = \tau_{co}$ is set, the time constant $\tau_R$ of the change of the atom group from the ground state to the excited state in the range of $\lambda_D$ is expressed as:

$$\tau_R = \left(\frac{\tau_{co}}{\left(\frac{r}{c}\right)}\right) \cdot \tau_s$$

where c is the velocity of light, $3 \times 10^8$ m/sec. Assuming $l = 100\text{A}$ and $r = 3\text{A}$, $$\tau_R 10^{-7} - 10^{-6} \text{ sec}$$

$$\tau_{co} 10^{-8} - 10^{-7} \text{ sec}$$

The time constant of the natural emission, $$\tau_s = \frac{3}{4} \frac{h c^3}{\omega^3 \mu^2} = 10^{-17} - 10^{-18} \text{ (X-ray)}$$

For the correlated wall atoms, $$\tau_l = \frac{l}{c} = 3 \times 10^{-17} \text{ sec}$$

Photon velocity time between the atoms of the plate, $$\tau_a = \frac{r}{c} = 1 \times 10^{-18} \text{ sec}$$

$$\tau_R > \tau_{co} > \tau_s > \tau_l > \tau_a$$

Figure 2:
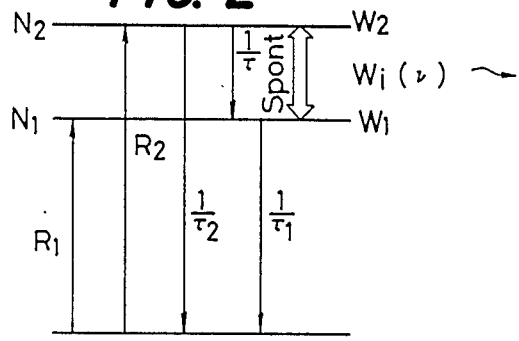
FIG. 2 is a diagram showing the relationship of atomic energy levels for considering a rate equation.

Under such conditions, the interaction between the wall plates is considered. To this end, a rate equation as indicated in FIG. 2 is considered. In this case, the transission is between S- and P-level in the L-shell. Letting $N_2$ and $N_1$ denote the high level (P-level) electron density and low level (S-level) density for the level transition of the atoms, respectively, the following holds in the stationary state:

$$N_2 - N_1 = \frac{\left[R_2 \tau_2 - \left(R_1 + \frac{\tau_2}{\tau_s} R_2\right)\tau_1\right]}{1 + \left[\tau_2 + \left(1 - \frac{\tau_2}{\tau_s}\right)\tau_1\right]W_i(\nu)}$$

Figure 3:
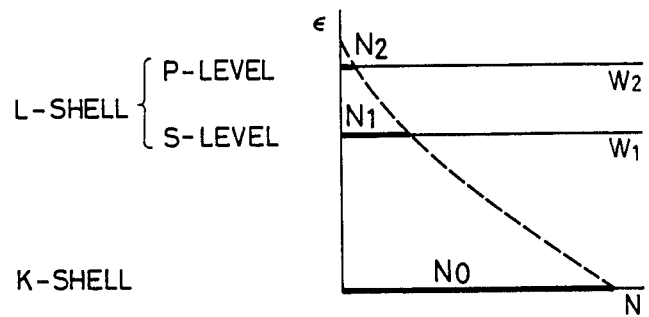
FIG. 3 is a diagram showing an electron distribution in levels in the case of thermal distribution.
Figure 4:
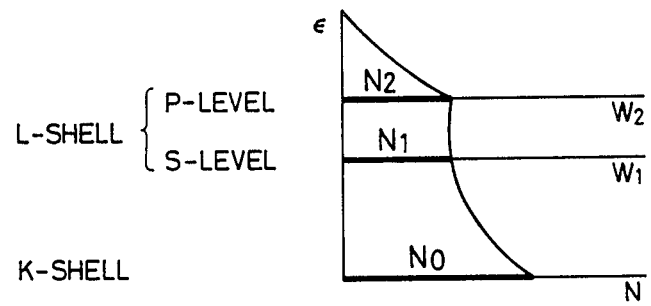
FIG. 4 is a diagram showing an inversion distribution in the case of projecting pumping light from outside.

In case of thermal equilibrium, $N_1$ and $N_2$ become:

$$N_2 - N_1 = (R_2\tau_2 - R_2\tau_1) < 0$$

and an electron distribution as shown in FIG. 3 is established. When the pumping X-ray (light) is externally projected, the number of excited electrons and the number of ground electrons in the wall plate become as shown in FIG. 4. That is:

$$R_2 \tau_p \left(1 - \frac{\tau_1}{\tau_s}\right) 0, \tau_s > \tau_1$$

$N_2 - N_1 = 0$ holds, and the numbers of the electrons of the excited and ground levels are equal within the atom group in the layer of the device.

Moreover, when the atoms of each wall plate interact with each other through the wave of the fluorescent X-ray in the direction $k_z$, the following holds:

$$N_2 - N_1 = \frac{R_2\left[\left(1 - \frac{R_1}{R_2}\right)\tau_2 - \frac{\tau_2}{\tau_s}\tau_1\right]}{1 + \left[(\tau_2 + \tau_1) - \frac{\tau_2}{\tau_s}\tau_1\right]W_i(\nu)}$$

For $W_i(\nu) > 0$ $(W_i(\nu) = f(\text{emission}) \times \text{transition probability} (1+(1-f)\text{absorption})$, f is the ratio of the population), $$N_2 - N_1 \frac{R_2}{\frac{1}{\tau_p} + n\frac{2\pi\mu^2}{\epsilon_0 h^2 \nu} \int_0^\infty h\nu m(\nu) g(\nu) d(\nu)}$$

and $$N_2 - N_1 > 0$$

$$\tau_p > \tau_{co} > \tau_s > \tau_l$$

Figure 5:
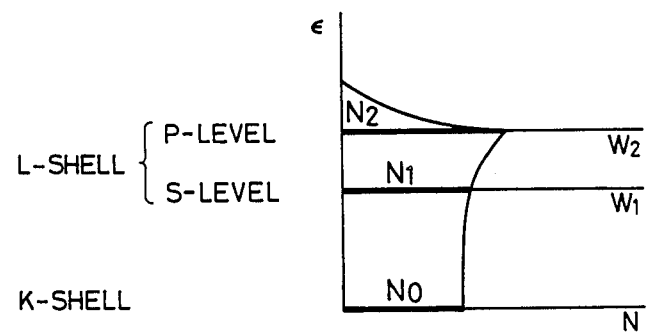
FIG. 5 is a diagram showing an electron distribution in the case of correlation due to a wave in the $k_z$ direction.

At this time, the electron distribution of population inversion is demonstrated as shown in FIG. 5.

Figure 6:
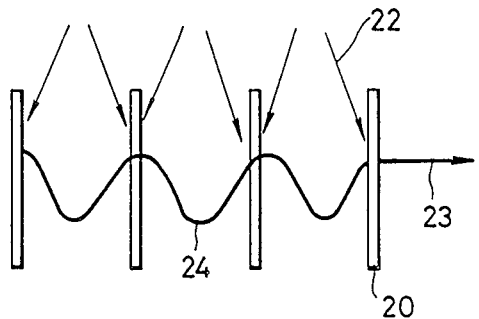
FIG. 6 is a diagram for explaining the state in which the population inversion has been further intensified, so that a standing wave permeates through wall plates to emit coherent light.

However, when the number of photons is large, $$W_i(\nu) \approx \int_0^\infty h \, m(\nu) g(\nu) d(\nu)$$

becomes a large value, and $$N_2 - N_1 = 0$$

holds. Accordingly, the population inversion disappears. However, when the number of photons $N_p$ is greater than the density of atoms $N_s$ of the wall plate, the photon oscillations between the wall plates become a standing wave 24 as shown in FIG. 6, in which numeral 20 indicates each wall plate and numeral 22 indicates pumping by a high energy photon beam. When the intensity of the standing wave becomes strong, the dielectric function of the wall become nearly 1, and coherent light 23 is emitted to come the out of the device, by the superradiant effect. The conditions of the occurance of the superradiant are:

$$2\pi N_s \mu^2 < h\omega_p$$

$$\mu = e^\epsilon$$

$$\omega \tau_R > 1$$

As exemplified in FIG. 6, the least number of photons of the standing wave fulfills, in a certain half wavelength region, the following conditions:

$$2\pi N_s \mu^2 > h\omega$$

$$\omega \tau_R < 1$$

This wave is very stable. It causes the dressed field at the correlated level of the atom group based on the superposition of the ground states. Then, the lifetime is long, and the output of the emitted wave is of great power.

The above-mentioned treats the emission $W_i$ with the transition between K-shell and L-shell, however; superradiation according to the transition between K-shell and L-shell is considered the same as the above-mentioned, and the rate equations are denoted by substituting $R_1$ and $R_2$ to $R_i$, $\tau_1$, $\tau_2$ and $\tau_s$ to $\tau_i$, $N_2$ to $N_i$ and $N_1$ to $N_0$. The concrete description of the above-mentioned principle of the this invention is as follows.

As shown in FIG. 1a, the layered structure with the fluorescent wall plates 10, periodically arranged, are externally irradiated with the pumping ray 11 in a direction approximately parallel to the plane of the wall plate 10.

The fluorescent pumping ray 11 is from the source of the ray or generated when the electron beam 9 is irradiated on a layer of Zn, Mn or the like (hereinbelow, tentatively named "the fluorescent radiant layer for pumping, and not shown in FIG. 1a, but shown in FIG. 9 as layer 3). The X-rays are used as pumping light for the fluorescent material layers 2. The energy of the pumping X-rays needs to be set at a level at which the X-rays can penetrate through the supporting layer 1 and can pump the fluorescent material so as to radiate fluorescent X-rays. That is, letting $E_{ex}$ denote the energy of the pumping light, the relationship among $E_s$, $E_f$ and $E_{ex}$ is so selected as to be $E_{ex} > E_f > E_s$. Here, $E_f$ denotes the energy of the radiant fluorescence, and $E_s$ the excitation energy for atomic level of the material of the supporting layer.

The pumping light need not always be obtained by irradiating $Z_n$ or the like with the electron beam. Insofar as the energies of the pumping light etc. satisfy the aforementioned condition, it is of course allowed to directly use, e.g., a laser beam, X-ray beam or electron beam as the pumping light. Concrete examples will be described in detail in embodiments later.

That the thickness of the fluorescent material layer 2 is selected as the change of the phase difference of radiation within this layer is smaller is preferable. And the thickness of the supporting layer is set at a thickness which equals substantially M times (M: integer) the emitted wavelength.

In this condition, the thickness of the supporting layer 1 is so set that the arrival time from a wall plate to another wall plate of the radiated light from a wall plate (l/C) becomes smaller than the transition time C lifetime: $\tau_R$ of the electron at the excited state, where C is the velocity of the light. In other words, l is smaller than $C \cdot \tau_R$. When thickness (d) of the supporting layer is equal to l, it is easy to understand that it is easy to construct the Solid Fluoter. This is to be understood from the principle of the present invention stated before. Regarding the minimum thickness, the supporting layer may well be a monatomic layer as long as the function thereof is effected.

While the fluorescent material layers are usable up to about 100 layers, they are ordinarily used up to about 20 layers.

The energy of X-ray photons 40 produced from the fluorescent material layer 2 under the aforementioned conditions affect the transition moments of the atoms of the adjacent fluorescent material layers. Typically, the situation is as examplified below.

FIG. 1a shows a principle of the construction of the present invention, and means two cases of the present invention, that is: a first case that excitation (pumping) beam 9 (e.g. X-ray, with ray 11) from the source (X-ray generator) of it irradiates the fluorescent material layer (wall plate) 1 directly; and a second case that a radiant layer (not shown in FIG. 1a) is set in a space between beam 9 and wall plate 1, and the radiation 11 which is radiated from radiant layer 3 (in FIG. 9) when beam 9 (e.g. electron beam) irradiates the radiant layer, irradiates the wall plate.

Figure 9:
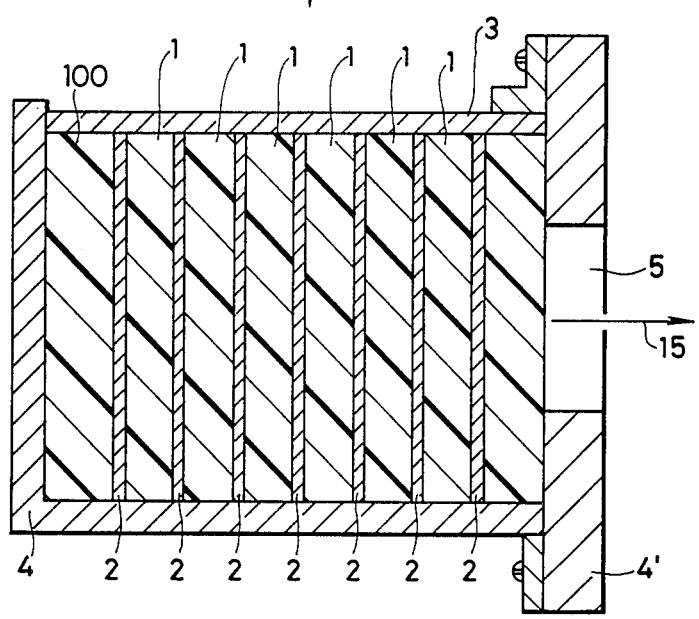

The radiant layer is shown in FIG. 9 as layer 3, concretely.

The X-rays 11 reach the fluorescent material layer 2, and generate the fluorescence X-rays 40 in, e.g., a place 32. Owing to these fluorescence X-rays 40, the fluorescent material layer 2 generates other fluorescence X-rays 40 in e.g., a place 33.

These fluorescent material layers are stacked with the supporting layers 1 mutually. The said supporting layer 1 is transparent to the said fluorescence X-rays. In this manner, the transition moments of the atoms affect each other, the time constant (lifetime) with the spontaneous emission of the individual atoms changes, and the electrons of all the atoms at the atomic levels are unified into the state of population inversion reverse to the Boltzmann distribution. Accordingly, the spontaneous emission of the individual atoms generate in synchronization in all of the atoms so as to cause super fluorescent light of high power in the state of coherence.

By way of example, Ni is used as the material which produces the fluorescence X-rays, Si as the supporting material which is transparent to the propagation of the X-rays, and Mo as the material which produces the exciting X-rays for pumping the fluorescent material, and a pulse electron flow of about 20 keV–30 keV on the order of picoseconds is emitted to the Mo material. Thus, the pumping X-ray 11 having a time constant smaller than $(2/\omega_p)$ where $\omega_p$ denotes the frequency of the fluorescence X-rays 40 which are equal to the plasma oscillation of Ni are produced from Mo, to give rise to the coherent X-ray in the spaces between the layers. When the number of photons has increased, the super radiation conditions are established, and the coherent pulse X-rays of high energy are generated as illustrated in FIG. 6. The intensities of the coherent states of the X-rays differ among the inter-layer spaces in which the fluorescence X-rays are emitted.

Figure 7:
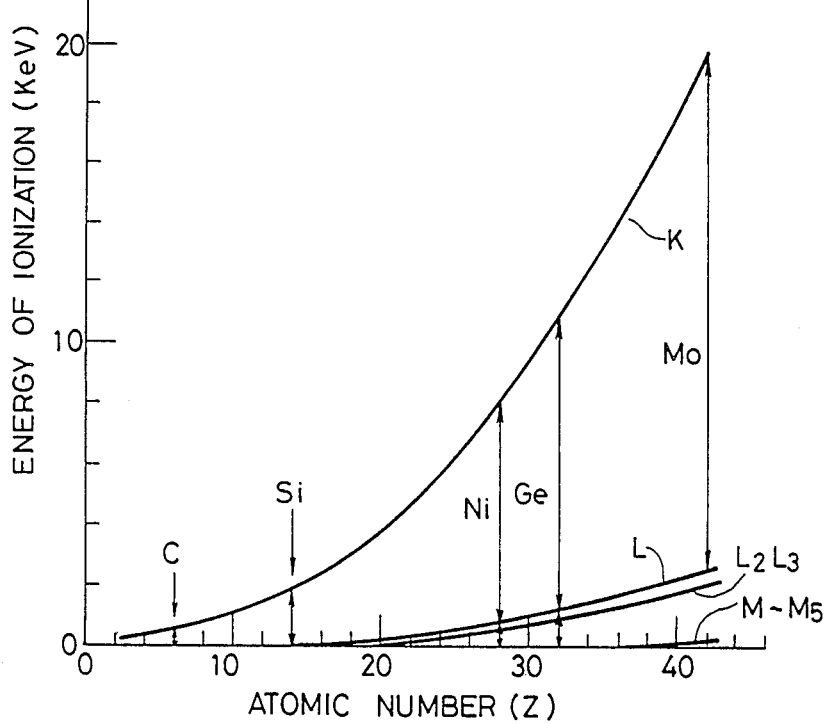
FIG. 7 is a diagram showing the relationships between several kinds of atoms and the ionization energies thereof.

The energies of the shells K, L, M etc. of the materials Si, Ni and Zn have values as indicated in FIG. 7. Fine solid lines indicate the energies of the each level of the atom. The energy difference between the K and L levels of the Si is great for the fluorescence X-rays, and this material is transparent with respect to the same.

As understood from the above description, the device of the present invention dispenses with a mirror for causing the feedback of light as in conventional laser devices.

In addition, the output intensity (I) is expressed as follows:

$$I_N(\vec{k}, t) = I(\vec{k}, 0) \frac{N}{2} (1 - f^2) - \frac{N^2}{2} f^2$$

$$\left[ \exp(i(K - K_0)) \cdot r \exp\left(\frac{2t}{\Delta t}\right) - \frac{1}{N} \right]$$

where f denotes the ratio of population inversion, N the number of photons, and I (k, 0) the natural output of one atom.

The first term of the equation expressive of the output intensity indicates the spontaneous emission, and the second term the super fluorescence output of the square of the number N of photons resulting from the interaction between the atoms.

While the above description has referred to soft X-rays as an example, the superradiant lighting device of the present invention can satisfactorily emit radiations ranging from hard X-rays of approximately 1 Å to visible light of 20000 Å order.

In this manner, the emission is possible from the X-ray region to the infrared region.

Typical examples of the pumping means, the fluorescent material and the supporting material are listed in Table 1.

TABLE 1

| Emitted Radiation | Exiting Means | Fluorescent Material | Supporting Material | Emission Wavelength |
|---|---|---|---|---|
| X-rays | Electron beam, | Ni | Si | 1.5Å |
|  | X-rays from Mo, Mn, Fe etc. | Na | C | 2Å |
| Visible radiation | Electron beam, | CdS | ZnS | 4900Å |
|  | Ruby laser | CdTe | ZnTe | 7900Å |
|  | Ruby laser, | GaAs | GaP | 8300Å |
|  | X-rays, Electron beam | InSb | InAs | 3100Å |
|  | Laser, | $Nd^{3+}$ | glass | 1.09 μm |
|  | Electron beam, | $Ni^{2+}$ | $MgF_2$ | 1.62–1.84 μm |
|  | X-rays | $Ni^{2+}$ | $MnF_2$ | 1.92 μm |

Figure 8:
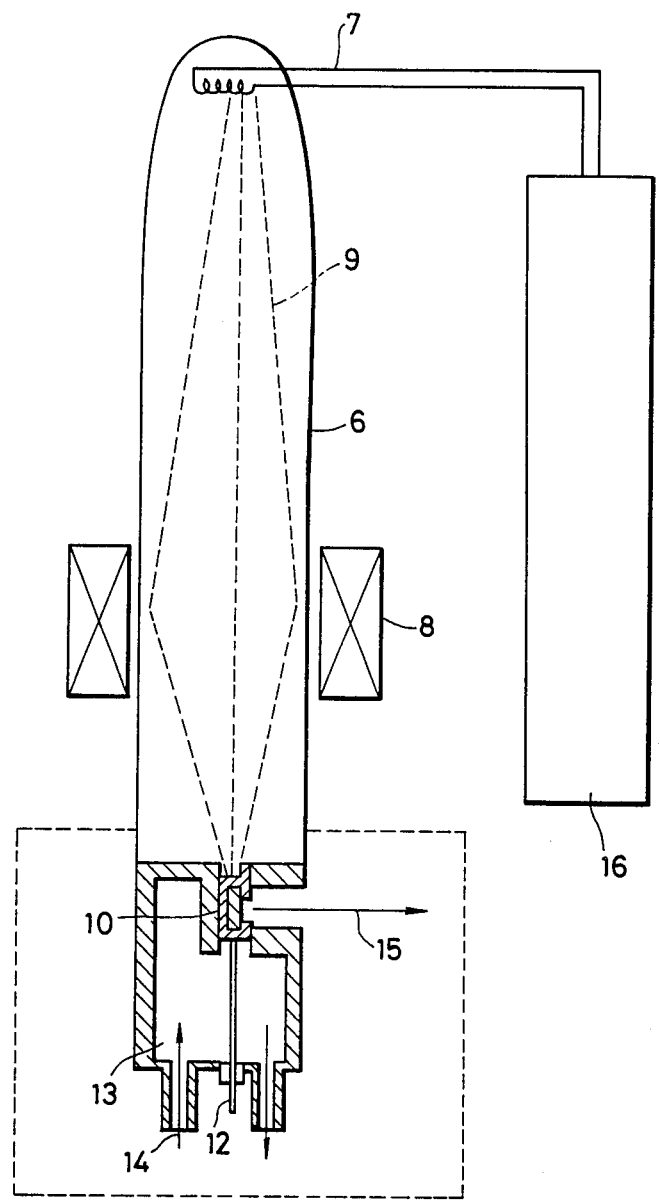
FIG. 8 is a view for explaining a lighting device according to the present invention.

FIG. 8 is a model diagram showing the principle setup of the "Solid Fluoter" of the present invention. Numeral 6 designates an envelope, the interior of which is held at a vacuum of approximately $10^{-8}$ Torr, in other words, as in ordinary vacuum tubes. A wall plate structure 10 is disposed at one end of the envelope 6. Naturally, this wall plate structure is so installed that a direction parallel to the planes of the fluorescent material layers and supporting material thereof agrees with the direction of incidence of pumping light. Numeral 7 indicates an exciting means source which is, for example, an electron beam source. The distance between the exciting means source 7 and the wall plate structure 10 is set at about 30 cm. A focusing coil 8 is provided in order that the electron beam 9 from the electron beam source may be converged on the wall plate structure 10. In case of using a laser beam or the like, it may be condensed by a mirror or the like. As stated before, exciting means other than the electron beam source, such as an X-ray source and a laser device is used in conformity with the arrangement of the wall plate structure.

A pulse current generated by a capacitor bank 16 is used as a power supply for the electron beam source, and the wall plate structure is irradiated with an electron flow of 20 keV–30 keV. The wall plate structure is cooled in liquid air in order to prevent the wall plate from melting. Numeral 12 indicates an electrode which is connected to the wall plate structure, and numeral 13 cooling means. Arrows 14 indicate the stream of the coolant.

The "Solid Fluoter" thus constructed can produce a super fluorescent light beam 15.

Embodiment 1:

There will be explained an example which employs a monatomic layer of Ni as a fluorescent material and Si as a supporting material. FIG. 9 is a sectional view of a wall plate structure. On a silicon substrate 100 having an area of 10 mm × 10 mm and a thickness of 0.5 mm, fluorescent material layers 2 and supporting material layers 1 are alternately stacked. By way of example, the fluorescent material was Ni, and its thickness was equivalent to a monatomic layer, while the supporting material was Si, and its thickness was controlled to 50 Å. The fluorescent material layers 2 were stacked into 10 layers. The respective layers were formed by the well-known molecular-beam epitaxial growth. Conventional vacuum evaporation may be resorted to for some thicknesses of the layers.

A Zn or Mn plate 3 serving as a radiant pumping layer having a thickness of 10 Å is mounted perpendicularly to the side surface of the respective layers of the lamination prepared as stated above.

The wall plate structure thus finished up is set in frames 4 and 4' made of lead, as illustrated in the figure. Lead is favorable because it prevents X-rays leakage. A window 5 for deriving a super fluorescent light beam is a circular opening having a diameter of 3 mm. This wall plate structure is installed on the envelope 6 as shown in FIG. 8.

When a pulsing electron flow of about 30 keV is projected on Mo, Ni atoms are irradiated with X-rays having energy of 20 keV, and plasma oscillations arise in the layers in which the Ni atoms are contained.

The theoretical intensity of coherent emission X-rays is evaluated by a rate equation. The quantum number of exciting X-rays is less than 5% of the number of electrons. When the electron flow is of 20 keV·1 μsec, the pulsing coherent X-rays continue for 1 millisec and have photons in a number approximately equal to (1/1000) of the number of input electrons.

Embodiment 2:

There will be explained an example which employs the crystal of Cds or GaAs as a fluorescent material and which produces visible super fluorescence.

This embodiment has a fundamental structure similar to that of FIG. 1. Fluorescent material (CdS) layers 2 and supporting material (ZnS) layers 1 are alternately stacked on a ZnS substrate having an area of 10 mm × 10 mm.

By way of example, the fluorescent material layer 2 was 5 Å thick, and the supporting material layer 1 was 15.5 μm thick. If the lifetime of the CdS is more than $10^{-9}$ Sec, then $C \cdot \tau_R$ of CdS is more than 30 cm approximately, therefore, 15.5 μm thick is adequately small. And the fluorescent material layers were stacked into 10 layers.

The fluorescent material layers and the supporting material layers were formed by the molecular-beam epitaxial growth.

In this case, the pumping radiant layer 3 is unnecessary unlike the case of Embodiment 1. Using a ruby laser as a pumping light source, a laser beam having a wavelength of 1.55 μm may be directly projected on the wall plate structure. The laser needs to have such an intensity that photons produced by the transition between energy levels in the Frenkel exciter cause plasma oscillations. An intensity of approximately 70 watts is used.

Even when the constructions of the fluorescent material, supporting material and exciting means as listed in Table 2 were used, predetermined super fluorescent light beams could be obtained.

In general, the interspace between the fluorescent material layers or the thickness of the supporting layer is set at about ½–10 times of an emission wavelength.

TABLE 2

| | Fluorescent material layer | | Supporting layer | | Exciting means | | | Emission Wavelength Å |
|---|---|---|---|---|---|---|---|---|
| | Material | Thickness | Material | Thickness | Means | Wavelength | Intensity | |
| 1 | CdTe | 5Å | ZnTe | 15800Å | Glass | 1 μm | 200 Mwatts | 7900 |
| 2 | GaAs | 5Å | GaP | 16600Å | Argon laser | 5200Å | 10 mwatts | 8300 |
| 3 | InSb | 5Å | InAs | 6200Å | Argon laser | 7700Å | 10 mwatts | 3100 |

Embodiment 3:

A wall plate structure can also be realized by employing a glass plate, $MgF_2$, $MnF_2$ or the like for a supporting layer and forming the surface of the supporting layer with an $Nd^{3+}$ or $Ni^{2+}$ ion-containing layer as a fluorescent material layer. In this embodiment, the pumping radiant layer 3 as be used in FIG. 9 is unnecessary.

Figure 10:
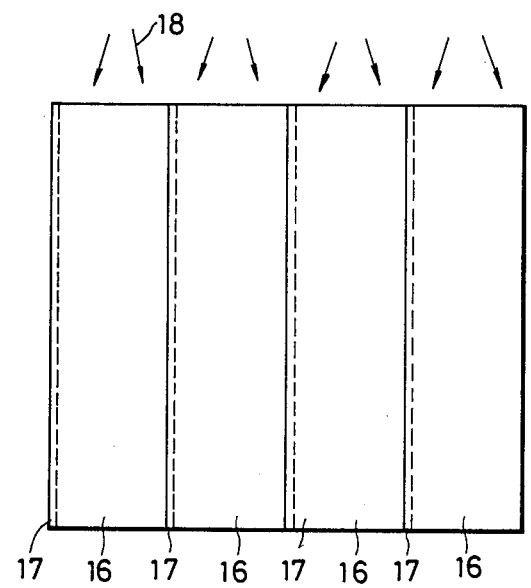

The fundamental structure of the wall plate structure in the present embodiment is as shown in FIG. 10.

The surface of a quartz glass plate 16 having a diameter of 10 cm and a thickness of $10^4$ Å is diffused with $Nd^{3+}$ ions, to form an $Nd^{3+}$ layer 17. In diffusing the ions, Nd is evaporated on the glass surface, whereupon the glass is heated to diffuse Nd thereinto. The density of the Nd ions is approximately $10^{21}/m^3$.

In general, the thickness of each glass plate is preferably set at (wavelength)×(1–10) or so.

Ten glass plates 16 thus prepared are so stacked that the $Nd^{+3}$ layers 17 and the bodies of the glass plates 16 are alternately arrayed, and they are mounted on frames 4 and 4' as in FIG. 9. In this embodiment, the pumping radiant layer 3 as in the embodiment of FIG. 9 is unnecessary. Pumping light 18 is directly projected on the wall plate structure. The wall plate structure thus prepared is installed on the envelope 6 as shown in FIG. 8. Using an argon laser (0.35 μm) or helium neon laser (0.63 μm) as a pumping light source, a superfluorescent light beam having an emission wavelength of 1.09 μm could be obtained.

While, in the above example, the quartz glass is used for the glass plates, other types of glass such as used for, e.g., optical fiber, may be used as well. Glass-like plates of $MgF_2$, $MnF_2$ etc. may be used as supporting members.

Even when the constructions of the diffusant ions for the fluorescent material, supporting material and exciting means (light or electron beam excitation) as listed in Table 3 were used, predetermined superfluorescent light beams could be obtained.

TABLE 3

| Supporting Material (Glass) | | Diffused layer | | | Exciting Means | | | Emission Wavelength (μm) |
|---|---|---|---|---|---|---|---|---|
| Material | Thickness | Ion | Layer Depth | Density | Means | Electron beam energy | Light intensity | |
| 1 $MgF_2$ | 1000Å | $Ni^{2+}$ | 5Å | $10^{-21}/cm^3$ | Light excitation electron beam | 20 keV | several W | 1.62–1.84 |
| 2 $MnF_2$ | 1000Å | $Ni^{2+}$ | 5Å | $10^{-21}/cm^3$ | Light excitation electron beam | 20 keV | several W | 1.92 |

What is claimed is:

1. A lighting device comprising:
   first material layers emitting a predetermined electromagnetic wave of spontaneous emission;
   second material layers substantially transmitting said electromagnetic wave, each of which is stacked between said first material layers so that interspaces 1 between said first material layers are smaller than $c \cdot \tau_R$, where c is the velocity of said electromagnetic wave and $\tau_R$ is a time constant of the spontaneous emission; and
   means for supplying said first material layers with a predetermined energy so that the spontaneous emission is caused in said first material layers.

2. A lighting device according to claim 1, wherein said first material layers are made of at least one element selected from the group consisting of Ni and Na, while said second material layers are made of at least one element selected from the group consisting of Si and C.

3. A lighting device according to claim 1, wherein said first material layers are made of at least one compound selected from the group consisting of CdS, CdTe, GaTe and InSb, while said second material layers are made of at least one compound selected from the group consisting of ZnS, ZnTe, GaP and InAs.

4. A lighting device according to claim 1, wherein said first material layers are made of at least one member selected from the group consisting of glass, $MgF_2$ and $MnF_2$, while said second material layers are made of at least one member selected from the group consisting of Nd or Ni formed in surface regions of said first material layers.

5. A lighting device according to claim 1, wherein said energy supplying means comprises a material layer which generates said predetermined energy as a pumping ray or beam.

6. A lighting device according to claim 1, wherein said first and second material layers are cooled.

7. A lighting device according to claim 1, wherein a density of higher level electrons within an atom group in said first material layers and a density of lower level electrons within the same atom group are set to be substantially equal.

8. A lighting device according to claim 1, wherein a density of higher level electrons within an atom group in said first material layers is set to be higher than a density of lower level electrons within the same atom group.

9. A lighting device comprising:
   a plurality of fluorescent material layers emitting an electromagnetic wave of spontaneous emission;
   a plurality of transparent material layers formed alternately with said fluorescent material layers so as to make each of interspaces between said fluorescent material layers have a length l not larger than $c \cdot \tau_R$ where c is a photon velocity of said electromagnetic wave and $\tau_R$ is a time constant of the spontaneous emission; and
   means for supplying energy to said fluorescent material layers so as to cause population inversion of electrons in said fluorescent material layers.

10. A lighting device according to claim 9, wherein said energy supplying means comprises a material layer which generates said energy as a pumping ray or beam.

11. A lighting device according to claim 9, wherein said first and second material layers are cooled.

12. A lighting device according to claim 9, wherein a density of higher level electrons within an atom group in said first material layers and a density of lower level electrons within the same atom group are set to be substantially equal.

13. A lighting device according to claim 9, wherein a density of higher level electrons within an atom group in said first material layers is set to be higher than a density of lower level electrons within the same atom group.

* * * * *